United States Patent Office 3,736,258
Patented May 29, 1973

3,736,258
THERMAL CONDITIONING OF "HYDROX" COMPOSITIONS
Allen A. Duswalt, West Chester, Pa., assignor to Hercules Incorporated, Wilmington, Del.
Filed June 4, 1971, Ser. No. 149,978
Int. Cl. C06b *19/06;* C06d *5/06*
U.S. Cl. 252—184                              9 Claims

ABSTRACT OF THE DISCLOSURE

A process for improving the stability of a gas generating composition comprised of an alkali metal nitrite, ammonium salt, and magnesium oxide or other basic stabilizing agent. The gas generating composition is stabilized by heating the composition at an elevated temperature until the measured rate of decomposition of the composition at the heating temperature becomes constant. When the rate of decomposition is constant, heating is stopped. The resulting composition is a heat stabilized gas generating composition.

---

Figure 2:
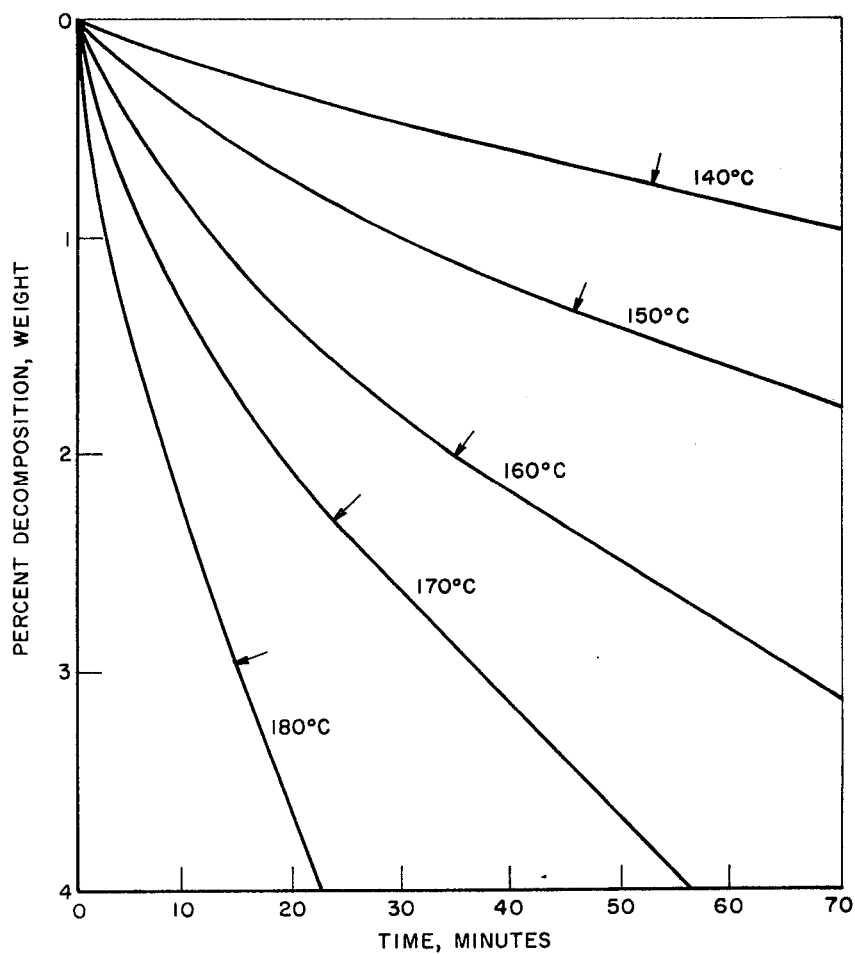

This invention relates to a process for stabilizing a gas generator composition comprising an alkali metal nitrite and an ammonium salt. More particularly, this invention relates to a heat treatment process for improving the stability of a gas generator composition comprising an admixture of alkali or alkaline earth metal nitrite, an ammonium salt and a stabilizing agent therefor.

Compositions comprising an intimate admixture of an alkali metal nitrite and an ammonium salt and in particular compositions comprising an intimate admixture of sodium nitrite and ammonium chloride have long been known as non-explosive, gas producing compositions. Compositions of this type are oftentimes referred to in the prior art as "Hydrox" powders or compositions. These compositions have principally been employed as blasting agents for use in mines. Hydrox compositions have many desirable properties. The principal deficiency with this class of gas generating compositions has been deterioration in the stability of the compositions during long periods of storage.

Efforts have been made in the past to determine the factors affecting the storage stability of Hydrox mixtures. Researchers have found that moisture is one cause of the deterioration of stability of the compositions during storage. Hydrox compositions produce moisture as a product of decomposition. It is not surprising, therefore, that the rate of decomposition of these compositions has been found to increase with time. As a result of other studies on the stability of Hydrox compositions, it was found that stability of the compositions improved with increasing pH value of the compositions. As a result of these studies materials which were both basic and exhibited drying properties were chosen for incorporation into Hydrox compositions. Tests showed that the stability of the Hydrox compositions containing such materials was improved. Agents for stabilizing Hydrox compositions such as alkali and alkaline earth oxides, carbonates and bicarbonates were found to be particularly suitable. A discussion on stabilizing of Hydrox compositions can be found in a book by James Taylor, entitled "Solid Propellant and Exothermic Compositions," Interscience Publishers Incorporated, New York, 1959.

It has now been found that the stability of Hydrox compositions containing stabilizing agents can be further improved by heat treatment of a Hydrox composition containing a stabilizing agent in accordance with the process of this invention. The process of this invention comprises the steps of:

(a) forming an intimate admixture of alkali or alkaline earth metal nitrite, an ammonium salt and a stabilizing agent, said admixture containing from about 4% to about 8% by weight of stabilizing agent, (b) heating the admixture of step (a) to a temperature at which decomposition of the admixture can be measured, (c) measuring the rate of decomposition of the admixture at the heating temperature and maintaining the admixture at heating temperature until the rate of decomposition becomes substantially constant, and (d) recovering the resulting admixture as a heat stabilized Hydrox composition.

While not bound by any theory it is believed that the marked increase in stability of the Hydrox compositions brought about by the heat treatment process of this invention is due to prereaction of points of contact or favorably positioned exposed surfaces or active sites of the alkali or alkaline earth metal nitrites and the ammonium salts with the consequent forming of an insulating area of a product salt between the reactants. Thus, in the case of a Hydrox composition comprising ammonium chloride and sodium nitrite, it is believed that the product salt, sodium chloride, functions as an insulator to further reaction of the Hydrox composition ingredients. There is also the possibility that a reduction of the already very low moisture content of the composition inhibits any transport mechanism between the reactants, thereby slowing the overall reaction rate.

There are various combinations of heating temperatures and times that can be employed to produce a stabilized Hydrox composition of this invention. A particularly suitable combination of time-temperature conditions is to heat the composition in an open container for about 25 minutes at a temperature of about 170° C. At higher temperatures, heating time at temperature can be reduced. At lower temperatures, i.e., below 170° C., heating times must be increased to achieve stabilization. The minimum heat treating temperature should be at least about 100° C. Regardless of the temperature chosen, the composition must be heated for a time sufficient so that the decomposition of the Hydrox composition with time at any given temperature is substantially linear. The heating temperature chosen must, however, be high enough for the decomposition to be accelerated sufficiently so that the decomposition is measurable by such methods, as weight loss, pressure increase and the like.

The following examples more fully illustrate this invention. In the examples, parts and percentages are by weight unless otherwise specified. Examples 1–5 illustrate the heat treatment process of this invention and the determination of stability of the composition as a result of weight-loss measurements.

EXAMPLE 1

Figure 1:
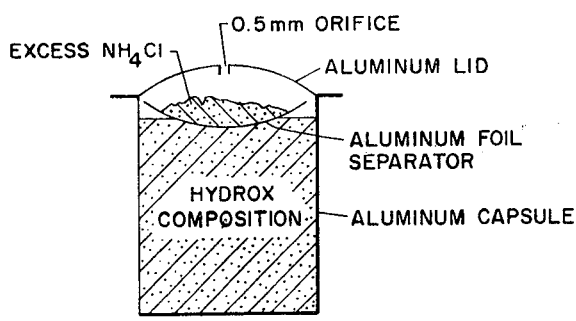

About 41 parts of ammonium chloride, 54 parts of sodium nitrite and 5 parts of magnesium oxide are vigorously shaken together to form an intimate admixture of these ingredients. The resulting composition contains about 0.1% by weight of moisture or less as determined by thermogravimetric analysis of the ingredients. The ammonium chloride and sodium nitrite are in powder form and have an average maximum particle dimension of about 0.35 mm. and about 0.27 mm. respectively. The magnesium oxide is in powder form. The admixture is placed in an aluminum capsule and partially covered with a foil separator. About 5 parts excess $NH_4Cl$ is placed on the top surface of foil separator. An aluminum lid having a gas-escape orifice 0.5 mm. in diameter covers the capsule and is sealed thereto. The test capsule is illustrated in FIG. 1. The excess $NH_4Cl$ compensates for loss of this material which would occur as a result of vaporization during heating if the excess materials were not present during the test.

Five capsules containing the Hydrox mixture prepared as described above are heat treated separately in a thermogravimetric analyzer. Decomposition of the compositions are measured in the thermogravimetric analyzer at temperatures of 140° C., 150° C., 160° C., 170° C. and 180° C., respectively. Isothermal weight-loss curves are obtained for the samples at each temperature level. After correcting for volatile loss of NH₄Cl, percent decomposition data is calculated based on the weight loss of the composition as a result of the decomposition reaction. The principal decomposition reaction which is believed to take place during heating is represented below:

$$NaNO_2 + NH_4Cl \longrightarrow NaCl + 2H_2O \uparrow + N_2 \uparrow$$

The result of weight loss-measurements made on the Hydrox compositions by thermogravimetric analysis is graphically represented in FIG. 2. These curves show that the rate of decomposition of the Hydrox samples decreases with time and that a slower, sustained decomposition rate which becomes substantially constant is reached after an initially more rapid decomposition. Each of the curves in FIG. 2 is marked with an arrow at the approximate point where the decomposition becomes substantially linear with time.

The following examples illustrate the improved stability of Hydrox compositions heat treated in accordance with the process of this invention. Comparison is made to the stability of Hydrox compositions containing stabilizing agents that have not been heat treated.

EXAMPLE 2

Seven aluminum capsules are filled with about 15 milligrams of a Hydrox composition comprising 41% ammonium chloride, 54% sodium nitrite and 5% magnesium oxide. The admixture is heated in a differential scanning calorimeter for 25 minutes at 170° C. Heating of the composition for this time at 170° C. corresponds to the condition necessary for the decomposition rate of this Hydrox composition to become linear as determined in Example 1. The resulting heat treated compositions are sealed in the aluminum capsules by cold welding an aluminum foil cover on the capsule so that a gas-tight seal results. The sealed capsules are then heated in the differential scanning calorimeter at 6 different temperatures. Five additional samples of the composition are charged to aluminum capsules and sealed in the capsules as above set forth. These samples are not subjected to any heat treatment. All of the samples are then heated until sufficient pressure develops in the sealed capsules as a result of decomposition of the Hydrox mixture to burst the capsule. The heating time at which each capsule burst is measured. The capsule burst pressure is about 69 p.s.i. The rate at which pressure builds up in the capsule is directly related to the stability of the composition. The relationship between reaction velocity and temperature determined by these tests is expressed by a form of the Arrhenius equation (1) copied below:

$$\log k = A + B\ (1000/°K.) \qquad (1)$$

Figure 3:
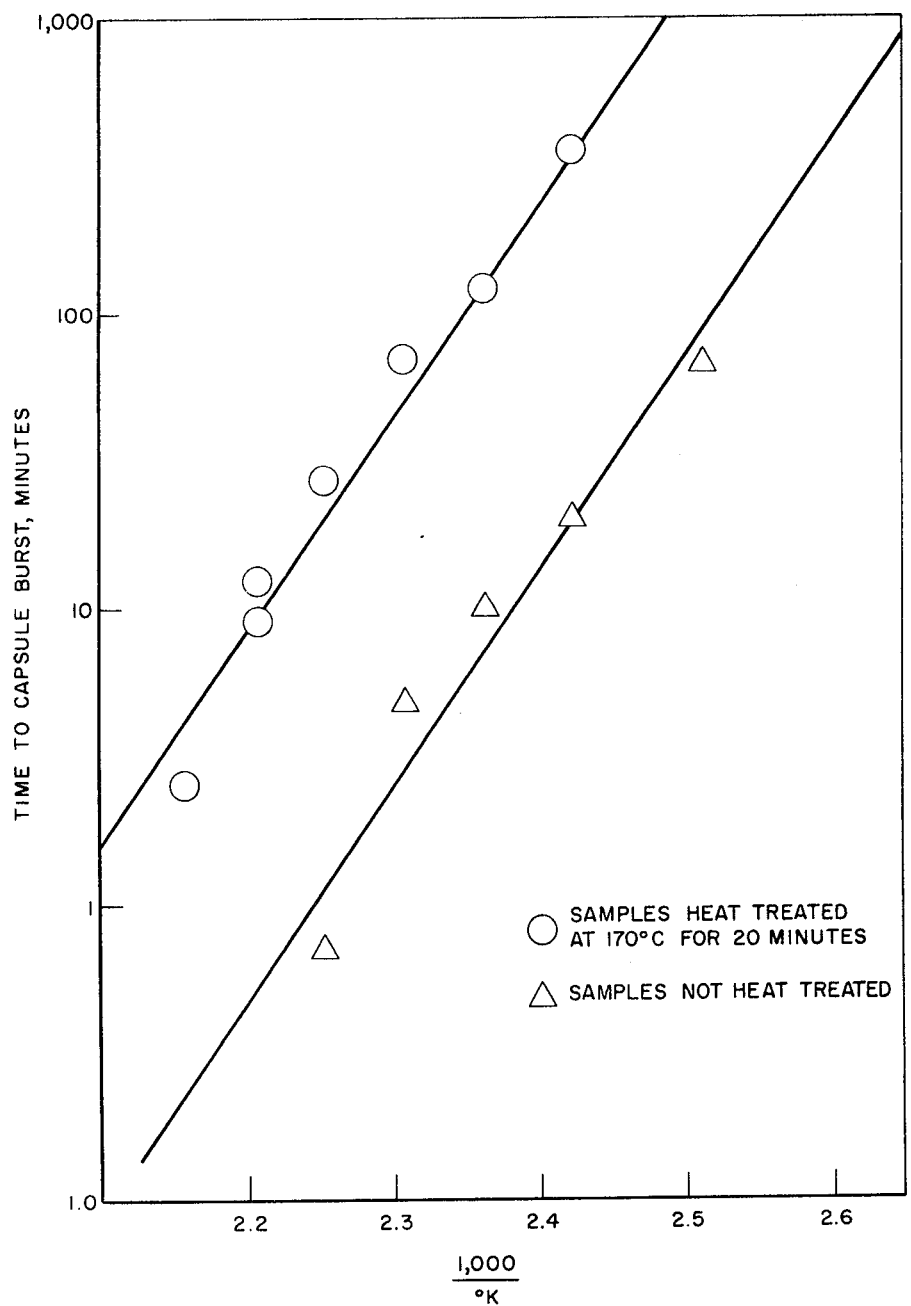

In this equation $k$ is the chemical reaction velocity expressed as percent reaction per hour, A is a constant and is the intercept value for the curve, B is a constant for the Hydrox compositions and is the slope of the curve and °K. is the reaction temperature in degree Kelvin. The results of the stability tests heretofore described are shown in FIG. 3 in an Arrhenius type plot of the test data based on the relationship expressed in Equation 1. The circles in FIG. 3 represent burst times of the Hydrox composition heat treated for 25 minutes at 170° C. The triangles represent burst times for the same Hydrox composition which has not been heat treated in accordance with this invention. A straight line is drawn through the two sets of plotted points. It is apparent that for all temperatures studied, the heat treated samples are much more stable than untreated Hydrox compositions. The rate of decomposition of the heat treated compositions was found to be only 1/13 of the rate of decomposition of the untreated composition.

Employing well known calculation methods and using the data from Example 2 on a magnesium oxide stabilized Hydrox composition, the stability of heat treated and untreated Hydrox compositions can be compared in terms of the reaction rate and pressure build up per year in p.s.i. for filled sealed systems. This data is set forth below in Table I.

TABLE I

| Storage temperature, °C. | Percent reaction per hour | | Nitrogen pressure (p.s.i./year) | |
|---|---|---|---|---|
| | Heat treated | Untreated | Heat treated | Untreated |
| 40 | 3.6×10⁻⁷ | 4.7×10⁻⁵ | 0.10 | 1.4 |
| 60 | 7.9×10⁻⁶ | 1.0×10⁻⁴ | 2.43 | 31.8 |
| 80 | 1.2×10⁻⁴ | 1.6×10⁻³ | 39.9 | 522 |
| 100 | 1.4×10⁻³ | 1.8×10⁻² | 487 | 6,400 |

EXAMPLES 3–5

Three Hydrox compositions are prepared, heat treated and tested as in Example 2 with the exception that the magnesium oxide stabilizer is replaced with sodium carbonate, basic magnesium carbonate and potassium carbonate respectively. The samples are heat treated at 170° C. for 25 minutes and the resulting compositions evaluated for stability in the sealed capsule burst test at 170° C. Results of the test are set forth in Table II below:

TABLE II

| | Stabilizer | Burst time (minutes) |
|---|---|---|
| Example: | | |
| 3 | Na₂CO₃ | >35 |
| 4 | MgCO₃ (basic) | >30 |
| 5 | K₂CO₃ | >29 |
| Control | MgO | 25–32 |

As can be seen from the comparative data in Table II, the sodium carbonate, basic magnesium carbonate and potassium carbonate are substantially equal to magnesium oxide as a stabilizing agent in accordance with this invention.

Hydrox compositions, as defined herein, are admixtures of alkali or alkaline earth metal nitrites, ammonium salts and stabilizing agents therefor.

The nitrites which can be employed in the Hydrox compositions and stabilizsed by the heat treatment process of this invention include such materials as sodium nitrite, potassium nitrite, rubidium nitrite, cesium nitrite, lithium nitrite, magnesium nitrite, calcium nitrite, strontium nitrite, barium nitrite and mixtures thereof. Illustrative ammonium salts which can be employed in Hydrox compositions are ammonium chloride, ammonium bromide, ammonium iodide, ammonium sulfate, ammonium sulfonate, mixtures thereof and the like. The alkali or alkaline metal nitrites and ammonium salts are generally employed in stiochiometric amounts.

The Hydrox compositions which can be stabilized by the heat treatment process of this invention must contain a chemical stabilizing agent in an amount from about 4% to about 8% based on the weight of the Hydrox composition containing said stabilizer. If less than about 4% stabilizer is employed, the improvement in stability of the composition as a result of the heat treatment process of this invention is marginal. When the stabilizer content is in excess of about 8%, little or no additional stabilization is achieved over the 8% stabilizer level.

Stabilizing agents which can be employed include the oxides, carbonates and bicarbonates of the alkali and alkaline earth metals such as sodium, potassium, lithium, magnesium, calcium, strontium and barium. Preferred stabilizing agents which can be employed include magnesium oxide, magnesium carbonate, sodium carbonate, and potassium carbonate.

Hydrox compositions which have been heat treated in accordance with this invention should be stored in a substantially moisture free environment for the compositions to maintain their improved stability. The heat treated Hydrox compositions of this invention have particular utility as blasting agents for use in mines and as chemical gas generators for inflation of inflatable devices such as air bags employed in automobile safety systems.

What I claim and desire to protect by Letters Patent is:

1. A process for improving the stability of a gas generating composition comprising alkali or alkaline earth metal nitrite, and ammonium salt and a stabilizing agent selected from the group consisting of oxides, carbonates and bicarbonates of the alkali or alkaline earth metals, said process comprising:
   (a) forming an admixture of an alkali or alkaline earth metal nitrite, an ammonium salt and stabilizing agent, said admixture containing from about 4% to about 8% by weight of stabilizing agent,
   (b) heating the admixture to a heating temperature of at least about 100° C.,
   (c) measuring the rate of decomposition of the admixture at the heating temperature and maintaining the admixture at heating temperature until the rate of decomposition becomes substantially constant, and
   (d) recovering the resulting heat stabilized gas generating composition.

2. The process of claim 1 wherein the alkali or alkaline earth metal nitrite is selected from sodium nitrite, potassium nitrite, magnesium nitrite, calcium nitrite, barium nitrite and mixtures thereof.

3. The process of claim 2 in which the ammonium salt is selected from the group consisting of ammonium chloride, ammonium bromide, ammonium iodide, ammonium sulfate, ammonium sulfonate, and mixtures thereof.

4. The process of claim 3 in which the stabilizing agents are present in the admixture in an amount of from about 4% to about 8% by weight, based on the total weight of the admixture.

5. The process of claim 4 in which the stabilizing agents are selected from magnesium oxide, magnesium carbonate, sodium carbonate, and potassium carbonate.

6. The process of claim 5 wherein the alkali metal nitrite is sodium nitrite and the ammonium salt is ammonium chloride.

7. The process of claim 5 wherein the alkali metal nitrite is sodium nitrite and the ammonium salt is ammonium bromide.

8. The process of claim 5 wherein the alkali metal nitrite is sodium nitrite and the ammonium salt is ammonium iodide.

9. The process of claim 6 wherein the stabilizing agent is magnesium oxide.

References Cited

UNITED STATES PATENTS

| 3,390,032 | 6/1968 | Albert | 149—45 |
| 3,449,181 | 6/1969 | Armontrout | 149—45 |
| 3,580,750 | 5/1971 | Griffith | 149—45 |

OTHER REFERENCES

Taylor, J., "Solid Propellant and Exothermic Compositions," 1959, George Newnes Limited, pp. 65–74.

MAYER WEINBLATT, Primary Examiner

I. GLUCK, Assistant Examiner

U.S. Cl. X.R.

23—293 R; 44—3 B; 149—45; 252—188.3, 350